US012664567B2

(12) United States Patent
Shirwadkar et al.

(10) Patent No.: US 12,664,567 B2
(45) Date of Patent: Jun. 23, 2026

(54) SYSTEM AND METHOD FOR PERSONALIZATION VIA USER EMBEDDINGS AND APPLICATIONS THEREOF

(71) Applicant: YAHOO ASSETS LLC, New York, NY (US)

(72) Inventors: Sanika Shirwadkar, Milpitas, CA (US); Kostas Tsioutsiouliklis, Saratoga, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/340,555

(22) Filed: Jun. 23, 2023

(65) Prior Publication Data

US 2024/0428295 A1    Dec. 26, 2024

(51) Int. Cl.
*G06Q 30/0251*          (2023.01)

(52) U.S. Cl.
CPC ............................... *G06Q 30/0269* (2013.01)

(58) Field of Classification Search
CPC ................................................ G06Q 30/0269
USPC ....................................... 705/14.66; 715/716
See application file for complete search history.

(56) References Cited

U.S. PATENT DOCUMENTS

| | | | | |
|---|---|---|---|---|
| 6,990,457 | B1 * | 1/2006 | Litman | G06Q 30/08 |
| | | | | 705/5 |
| 10,133,812 | B2 * | 11/2018 | Lee | G06F 16/335 |
| 10,484,817 | B1 * | 11/2019 | Chipouras | G06F 16/9537 |
| 12,190,283 | B2 * | 1/2025 | Luan | G06Q 10/08355 |
| 2003/0018658 | A1 * | 1/2003 | Suermondt | G06F 16/30 |
| 2007/0088801 | A1 * | 4/2007 | Levkovitz | H04L 12/1859 |
| | | | | 709/217 |
| 2007/0112840 | A1 * | 5/2007 | Carson | G06Q 30/0246 |
| | | | | 707/999.102 |
| 2010/0082421 | A1 * | 4/2010 | Tuladhar | G06Q 30/0242 |
| | | | | 705/40 |
| 2010/0162115 | A1 * | 6/2010 | Ringewald | G06F 16/68 |
| | | | | 715/716 |
| 2014/0025609 | A1 * | 1/2014 | Coster | G06N 5/02 |
| | | | | 706/46 |
| 2017/0337509 | A1 * | 11/2017 | Veras-Nunez | G06Q 10/087 |
| 2018/0096390 | A1 * | 4/2018 | Hemmaplardh | G06Q 50/01 |
| 2018/0300028 | A1 * | 10/2018 | Vora | G06F 9/451 |

(Continued)

OTHER PUBLICATIONS

Train in Data, Feature Scaling in Machine Learning: standardization, Minmaxscaling and more . . . ., Internet Archive Way Back Machine Capture date of Mar. 14, 2023 from URL: https://www.blog.trainindata.com/feature-scaling-in-machine-learning/, all (Year: 2023).*

(Continued)

*Primary Examiner* — Tarek Elchanti
(74) *Attorney, Agent, or Firm* — Venable LLP

(57) ABSTRACT

The present teaching relates to method, system, medium, and implementations for personalized content service. Information related to a user is first obtained with a user profile indicative of multiple interests of the user. User embeddings are computed with respect to some interests of the user based on interest embeddings of such interests to capture semantics of such interests as well as additional interests temporally related to the interests. Personalized content is identified based on the user embeddings and is provided to the user.

12 Claims, 14 Drawing Sheets

(56)  References Cited

U.S. PATENT DOCUMENTS

| | | | |
|---|---|---|---|
| 2019/0019105 A1* | 1/2019 | Schatz | G06N 3/08 |
| 2019/0042185 A1* | 2/2019 | Young | G06F 3/167 |
| 2019/0172089 A1* | 6/2019 | Tang | G06Q 30/0242 |
| 2019/0213167 A1* | 7/2019 | Bettencourt da Silva | |
| | | | G06F 40/30 |
| 2019/0332946 A1* | 10/2019 | Han | G06N 5/022 |
| 2020/0042610 A1* | 2/2020 | Boles | G06F 16/24578 |
| 2020/0045008 A1* | 2/2020 | Banothu | G06Q 30/0276 |
| 2020/0050941 A1* | 2/2020 | Zhuang | G06N 3/044 |
| 2020/0184515 A1* | 6/2020 | deWet | G06Q 30/0251 |
| 2021/0335143 A1* | 10/2021 | Jenkins | G06V 10/82 |
| 2023/0135683 A1* | 5/2023 | Balasubramanian | |
| | | | G06Q 30/0241 |
| | | | 705/26.7 |
| 2024/0346309 A1* | 10/2024 | Majumdar | G06N 3/09 |
| 2024/0386348 A1* | 11/2024 | Reichl | G06Q 10/06316 |
| 2025/0005263 A1* | 1/2025 | Mansour | G06F 40/134 |
| 2025/0080802 A1* | 3/2025 | Emmanuel | H04N 21/25891 |
| 2025/0111162 A1* | 4/2025 | Hu | G06F 40/35 |
| 2025/0200592 A1* | 6/2025 | Kwittken | G06Q 30/0276 |
| 2025/0220084 A1* | 7/2025 | Kuppusamykrishnan | |
| | | | G06T 11/00 |
| 2025/0245548 A1* | 7/2025 | Haramaty-Krasne | |
| | | | G06N 20/00 |
| 2025/0321991 A1* | 10/2025 | Gardner | G06F 40/253 |

OTHER PUBLICATIONS

Better Data Science, Data Scaling for Machine Learning—The Essential Guide, Internet Archive Way Back Machine Capture date of May 22, 2022 from URL: https://betterdatascience.com/data-scaling-for-machine-learning/#google_vignette, all (Year: 2023).*

Becoming Human, AI, Demystifying Feature Scaling, Internet Archive Way Back Machine Capture date of Jul. 18, 20219 from URL: https://becominghuman.ai/demystifying-feature-scaling-baff53e9b3fd?gi=363dd8d86198, all (Year: 2023).*

Nikolaos Nanas, Multi-topic Information Filtering with a Single User Profile, 2004 (Year: 2004).*

Insightoftware, Top 5 Predictive Analytics Models and Algorithms, 2024 (Year: 2024).*

* cited by examiner

Interest Embeddings

Temporal Embeddings 390

Semantic Embeddings 380

Sliding Window

Wikipedia
The Free Encyclopedia

| Article | $E_1$ | $E_2$ | --------- | $E_{n-1}$ | $E_n$ |
|---------|-------|-------|-----------|-----------|-------|
| 1 | Elon Musk | Twitter | --------- | Acquisition | |
| 2 | Twitter | Elon Musk | --------- | Lawsuit | |
| 3 | Spy Balloon | China | --------- | Diplomacy | |
| 4 | | | | | |
| --------- | --------- | | --------- | --------- | --------- |
| k | | | | Beauty | |

Fig. 5B

Access Wikipedia for interest & content on interests 505

Create training data for ML semantic embeddings 515

Derive, via ML, semantic embeddings of interests 525

Obtain content of a determined temporal sliding window 535

Extract entities from each article 545

Generate ranked entity list for each article 555

Learn, via ML, temporal Embeddings 565

SYSTEM AND METHOD FOR PERSONALIZATION VIA USER EMBEDDINGS AND APPLICATIONS THEREOF

BACKGROUND

1. Technical Field

The present teaching generally relates to computers. More specifically, the present teaching relates to data analytics and application thereof.

2. Technical Background

With the advancement of the Internet, most people in the society now conduct their daily affairs online, including consuming different types of content (articles or videos), checking out different products, making purchases of just about everything, enjoying entertainment, receiving/providing education, or even taking virtual vacations. Such a shift in social behavior has motivated most entities, including individuals, companies, organizations, universities, or interest groups, to place a tremendous amount of information on the Internet to share, to motivate discussions, and to monetize. In the meantime, online service providers such as content portals, advertisers, or social media platform operators have attempted to improve services by providing more relevant content to each user via personalization based on, e.g., user profiles. This framework 100 is illustrated in FIG. 1A, where users 110 consume content from a content engine 130 provided based on information from different content sources 150 via network 120. To assist users to access information of their interests in such a sea of information, the content engine 130 (search engines or content portals) provides information of interests for individual online users via personalization based on user profiles 140.

Traditionally, a profile related to a user may include different types of information, as illustrated in FIG. 1B, which may comprise user' demographical information (including demographical feature 1, feature 2, . . . , feature M) and/or user's interests, which may either be declared (by the user), assigned (suggested by others), or estimated (from what users do). Demographical information may implicitly reflect a user's interests, e.g., people in a certain age group may likely be interested in certain topics. A user's interests may be represented as a list including multiple interests (interest 1, interests 2, . . . , interest N) with their corresponding scores (score 1, score 2, . . . , score N), representing, respectively. how strong of the interests. The estimated user interests may be estimated based on any online/offline information related to the user, such as user's search or content consumption history, user's online activities with respect to content of different topics, user's participation of various social groups, or even what others in the community relating to a user like or do (e.g., trendy topics and friends' activities). A user profile may then be constructed accordingly for personalization.

Such commonly used representation (a list with scores) for user interests does not capture complex relationships that often exist among different interests, making it impossible to leveraging such relationships in personalization to improve online services.

Thus, there is a need for a solution that addresses the issues discussed above.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for personalized content service. Information related to a user is first obtained with a user profile indicative of multiple interests of the user. User embeddings are computed with respect to some interests of the user based on interest embeddings of such interests to capture semantics of such interests as well as additional interests temporally related to the interests. Personalized content is identified based on the user embeddings and is provided to the user.

In a different example, a system is disclosed for personalized content service. The disclosed system includes a user profile retriever, a user embedding generator, a content search/recommendation engine, and a user interface. The user profile retriever is provided for obtaining information related to a user, including a user profile indicative of multiple interests of the user. The user embedding generator is provided for computing user embeddings with respect to the user based on at least some interest selected from the multiple interests as well as interest embeddings associated with the at least some interest. The user embeddings capture both semantics of the at least some interest and additional interests temporally related to the at least some interest. The content search/recommendation engine is provided for identifying content relating to the at least some interest via personalization based on the user embeddings. Such personalized content is then provided to the user via the user interface.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for personalized content service. The information, when read by the machine, causes the machine to perform various steps. Information related to a user is first obtained with a user profile indicative of multiple interests of the user. User embeddings are computed with respect to some interests of the user based on interest embeddings of such interests to capture semantics of such interests as well as additional interests temporally related to the interests. Personalized content is identified based on the user embeddings and is provided to the user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5B illustrates exemplary ranked entity lists generated for corresponding online articles for generating temporal embeddings, in accordance with an embodiment of the present teaching;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

Figure 2A:
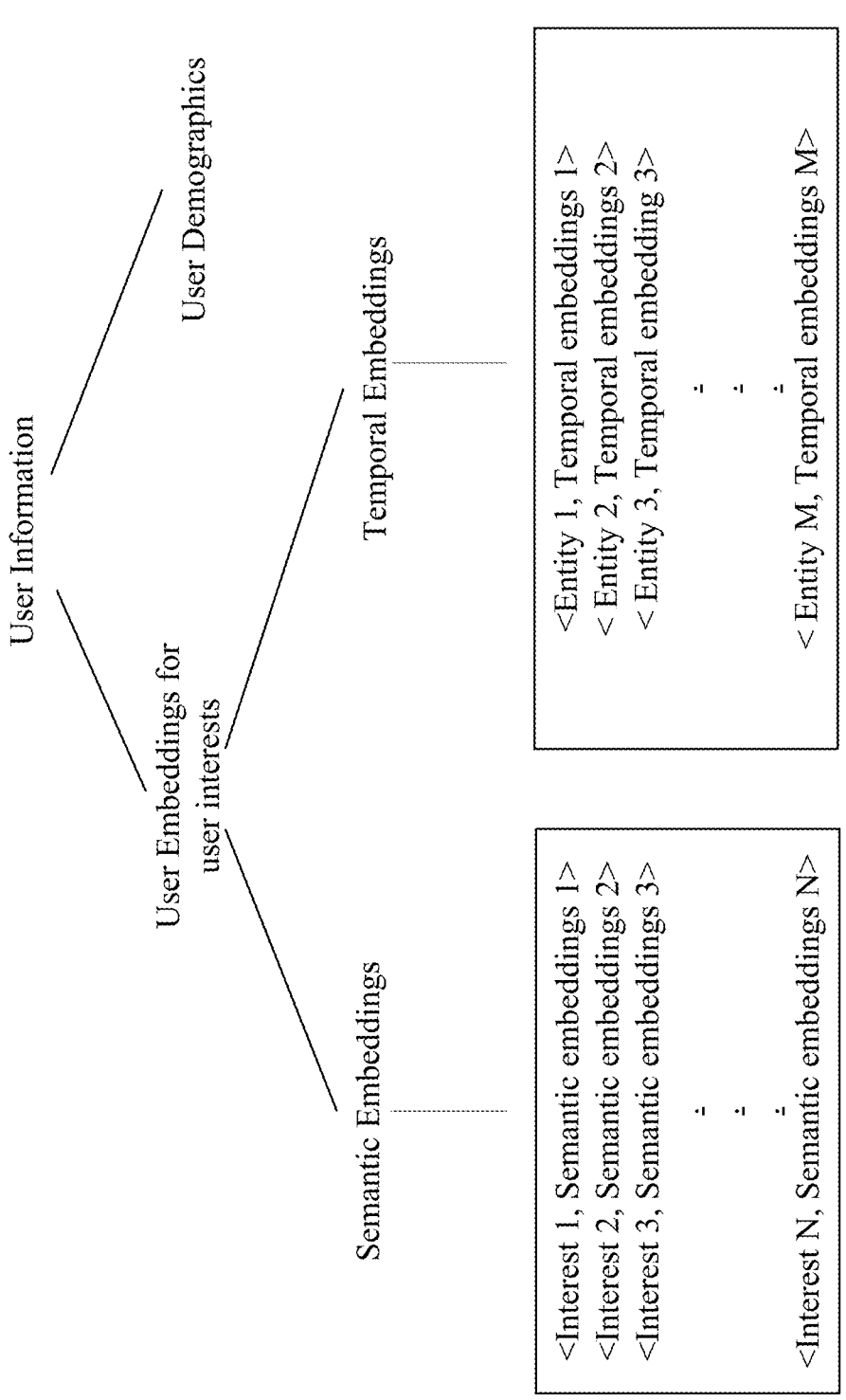
FIG. 2A depicts an exemplary construct of user information for personalization via user embeddings developed based on semantic embeddings associated with user's interests and temporal embeddings, in accordance with an embodiment of the present teaching.

The present teaching discloses an exemplary framework for improved online services with enhanced personalization based on user embeddings that characterize a user's interest in terms of both semantics and temporal implicated interests relevant to the user. This is shown in FIG. 2A, which depicts an exemplary composition of user information for personalization using user embeddings, in accordance with an embodiment of the present teaching. As shown, the user embeddings are created based on semantic embeddings associated with user's interests (represented in FIG. 2A as semantic embeddings 1 for interest 1, semantics embeddings 2 for interest 2, . . . , semantic embeddings N for interest N) as well as temporal embeddings (e.g., represented in FIG. 2A as temporal embeddings 1 corresponding to interest 1, temporal embeddings 2 corresponding to interest 2, . . . , and temporal embeddings M corresponding to interest M). In this illustration, user information is used for personalization, and the user information includes both user demographics as well as user embeddings, which characterize user's interests in terms of both semantics and temporal implications and are captured in a manner as disclosed in the present teaching.

Figure 2B:
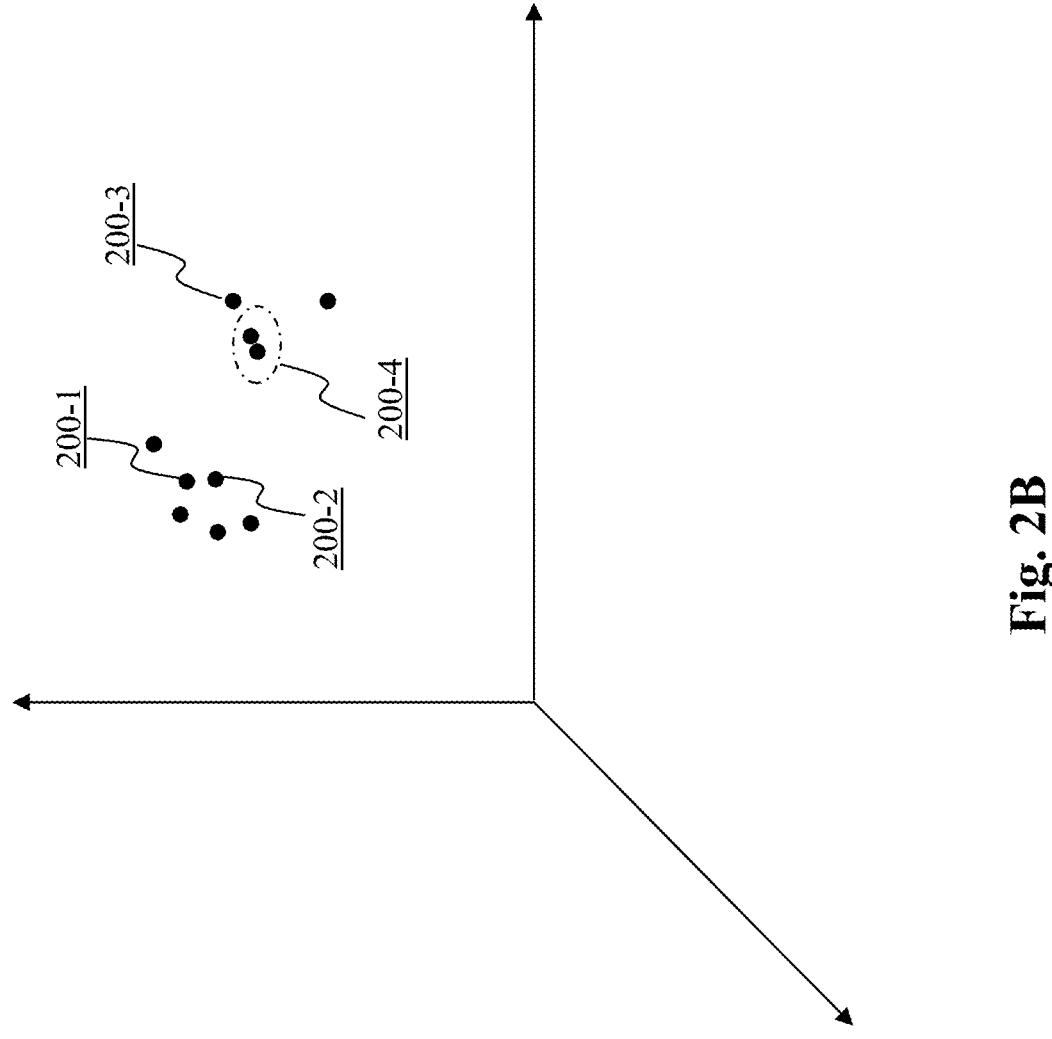
FIG. 2B shows exemplary semantic relationships among different interests captured by semantic embeddings of such interests that may be leveraged in personalization, in accordance with an embodiment of the present teaching.

According to the present teaching, a user's interests may be represented by both the semantics of estimated interests as well as those interests captured via temporal relationships. In some embodiments, semantic embeddings for an interest (e.g., on one or more topics) may be derived via machine learning based on textual information defining the interest (obtained from, e.g., a commonly recognized platform such as Wikipedia) and optionally also online content related to the topics. By capturing the semantics of each interest via embeddings via learning (from training data), the learned semantic embeddings also capture the relationships among different interests. For example, when embeddings for different interests are projected into the embedding feature space, as illustrated as different projected points 200-1, 200-2, 200-3, and 200-4, etc. in FIG. 2B, the spacing or distance between any two projected points represents the semantic relationships among these interests. The closer the two projected points are, the more semantically similar they are. For instance, as points 200-3 and 200-4 in FIG. 2B are closer than points 200-3 and 200-1, the semantics of interest corresponding to point 200-3 (or the semantic embeddings of the interest) is closer in meaning to that of interest corresponding to point 200-4, as compared with that of interest of point 200-1. Such semantic relationship is not captured by the traditional representation of user's interests as in user profiles 140.

Figure 2C:
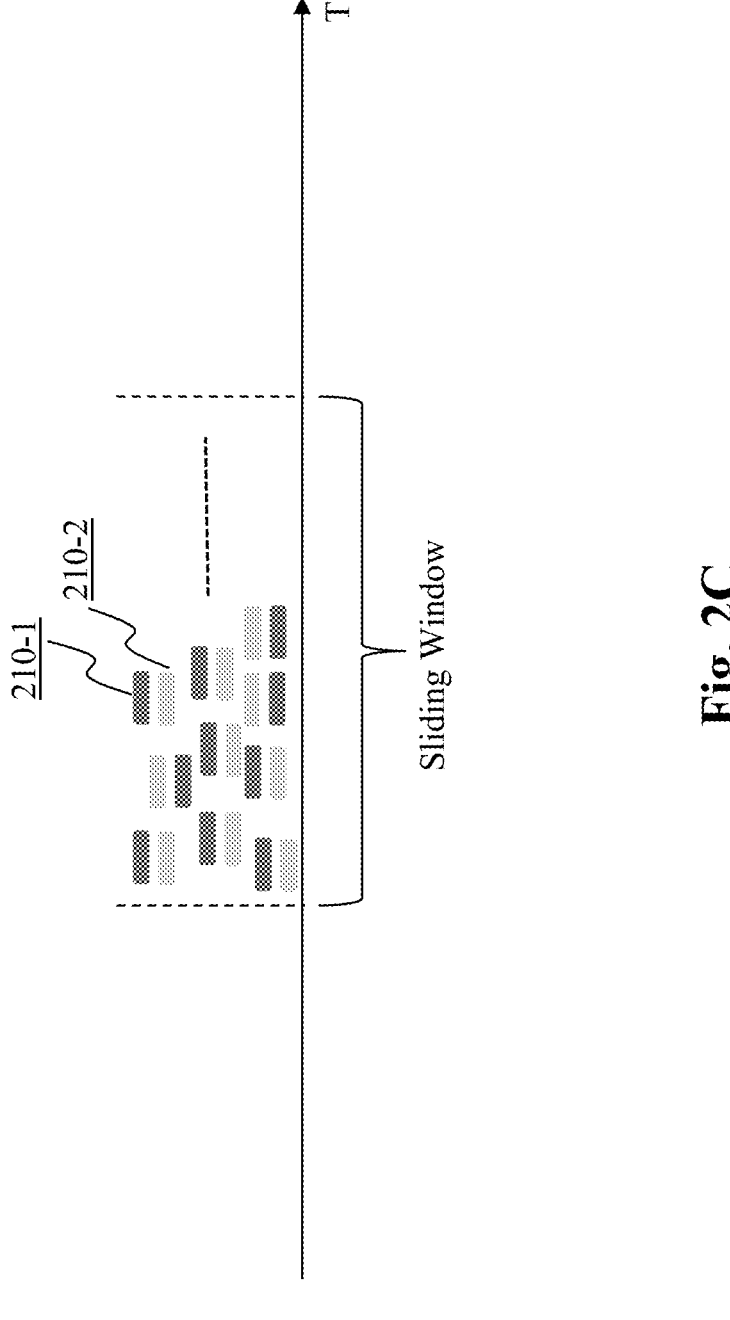
FIG. 2C shows exemplary temporal relationships among different interests captured via temporal embeddings based on content co-appearing with respect to a sliding window, in accordance with an embodiment of the present teaching.

In addition to capturing the semantics of interests via embeddings, the present teaching also discloses to capture additional interests that, although are not explicitly listed as user's interests, are temporally connected to the user when they co-occur in content under some temporal conditions. Temporal embeddings are used to capture such co-occurring interests and may be derived via machine learning based on online content published within a specified temporal period. This s illustrated in FIG. 2C, where 210-1 and 210-2 represent two interests that co-occur in content within a sliding window in time (or temporal period). For instance, due to the Twitter acquisition, entities Elon Musk and Twitter (corresponding to two separate interests) may often co-occur in the same online articles. Such temporal closeness may indicate that there are some relationships between these two interests exhibited within the temporal period considered. Although such temporal connections among different interests may be more transient, capturing such connections may facilitate improved services in the same temporal period. For instance, given the detected temporal relationship between Elon Musk and Twitter, whenever a user searches for Elon Musk or the content service engine identifies recommended content to the user, online articles related to both Elon Musk and Twitter may both be recommended to the user based on the temporal relationship between the two.

In some embodiments, as each interest may be represented by the semantic embeddings and temporal embeddings, according to the present teaching, semantic embeddings and temporal embeddings associated with relevant interests of a user may be integrated to generate user embeddings to represent the user's interests and such created user embeddings may be utilized to perform personalization. Such user embeddings capture semantics as well as temporal aspects of user's interests and the relationships thereof. Content identified based on such integrated user embeddings capture knowledge about the user and temporal environment in a way that the traditional user profiles 140 are not capable of providing.

Figure 1A:
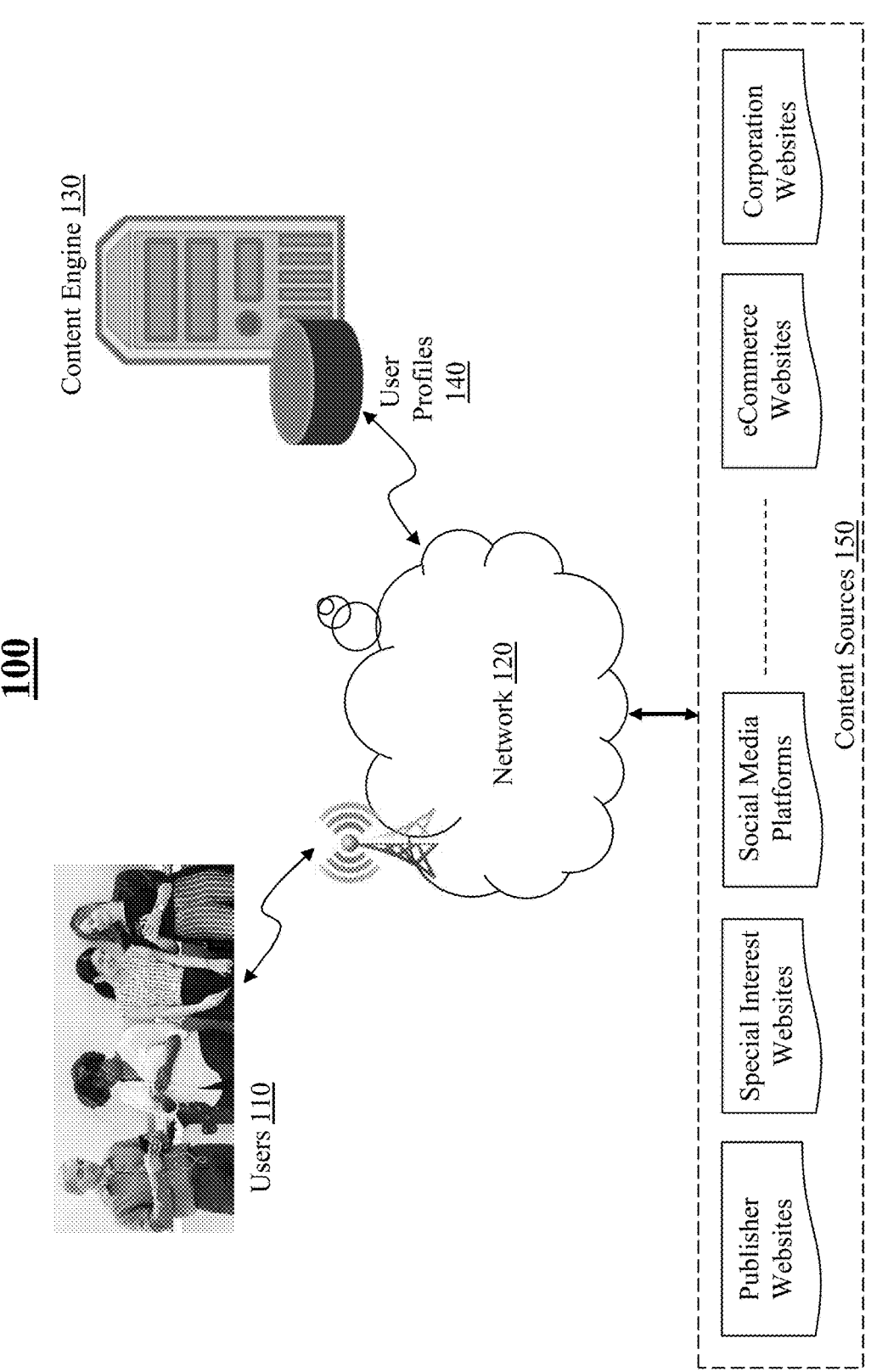
FIG. 1A illustrates a traditional framework for serving online users via personalization using user profiles.
Figure 1B:
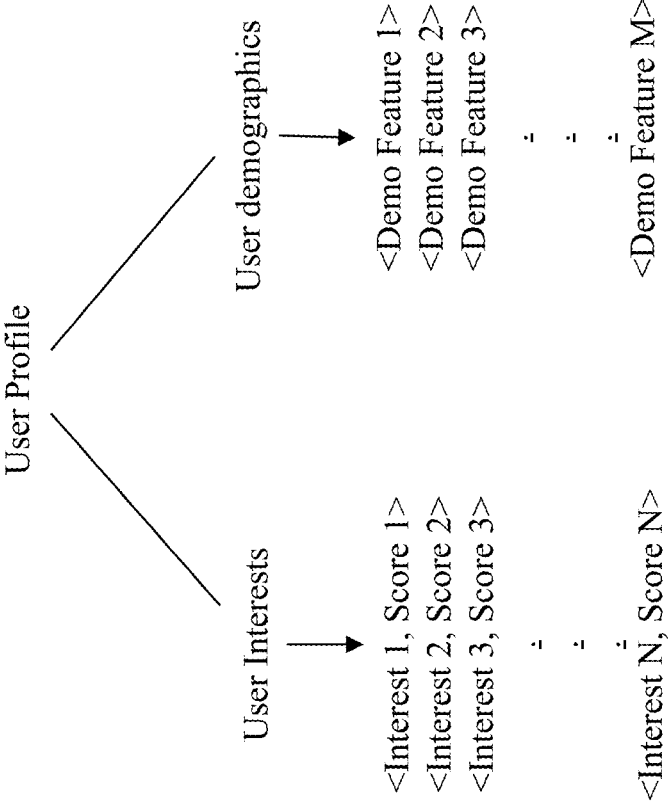
FIG. 1B shows an exemplary traditional user profile for personalization.
Figure 2D:
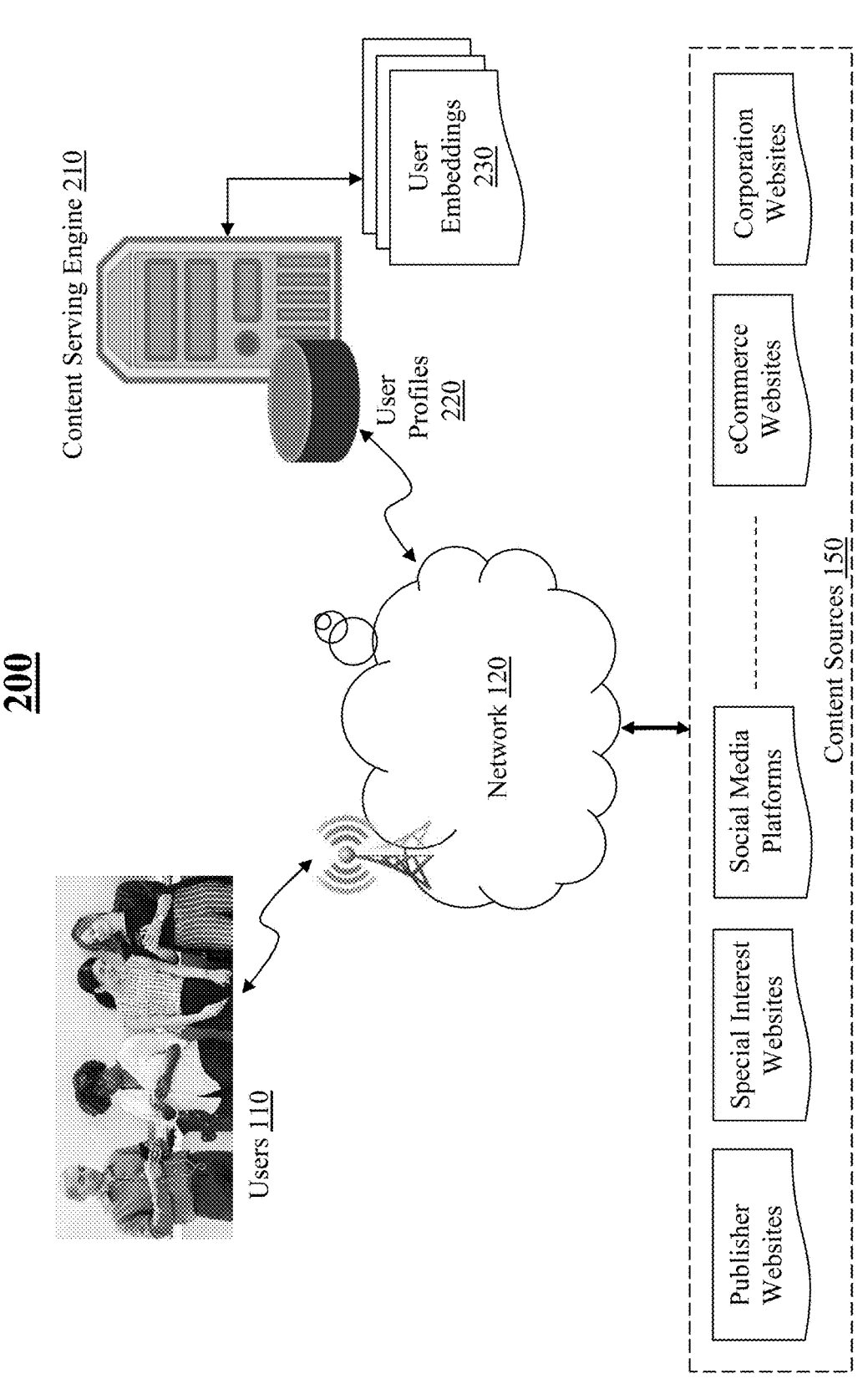
FIG. 2D depicts an exemplary improved framework for personalized content services based on user embeddings, in accordance with an embodiment of the present teaching.

As discussed herein, user embeddings, as illustrated in FIG. 2A, may be created by integrating semantic embeddings for different user's interests as well as temporal embeddings derived against a relevant temporal window. FIG. 2D depicts an exemplary improved framework 200 for improved personalized content services based on user embeddings, in accordance with an embodiment of the present teaching. In this framework 200, users 110 consume content from a content service engine 210, where content to individual users is identified from different content sources 150 through personalization based on user embeddings 230, which are created in accordance with the present teaching. Such personalized content is then provided to individual users via network 120. As compared with framework 100 as illustrated in FIG. 1A, the improved framework 200 provides enhanced services, via the content service engine 210, based on the user embeddings 230.

Figure 3A:
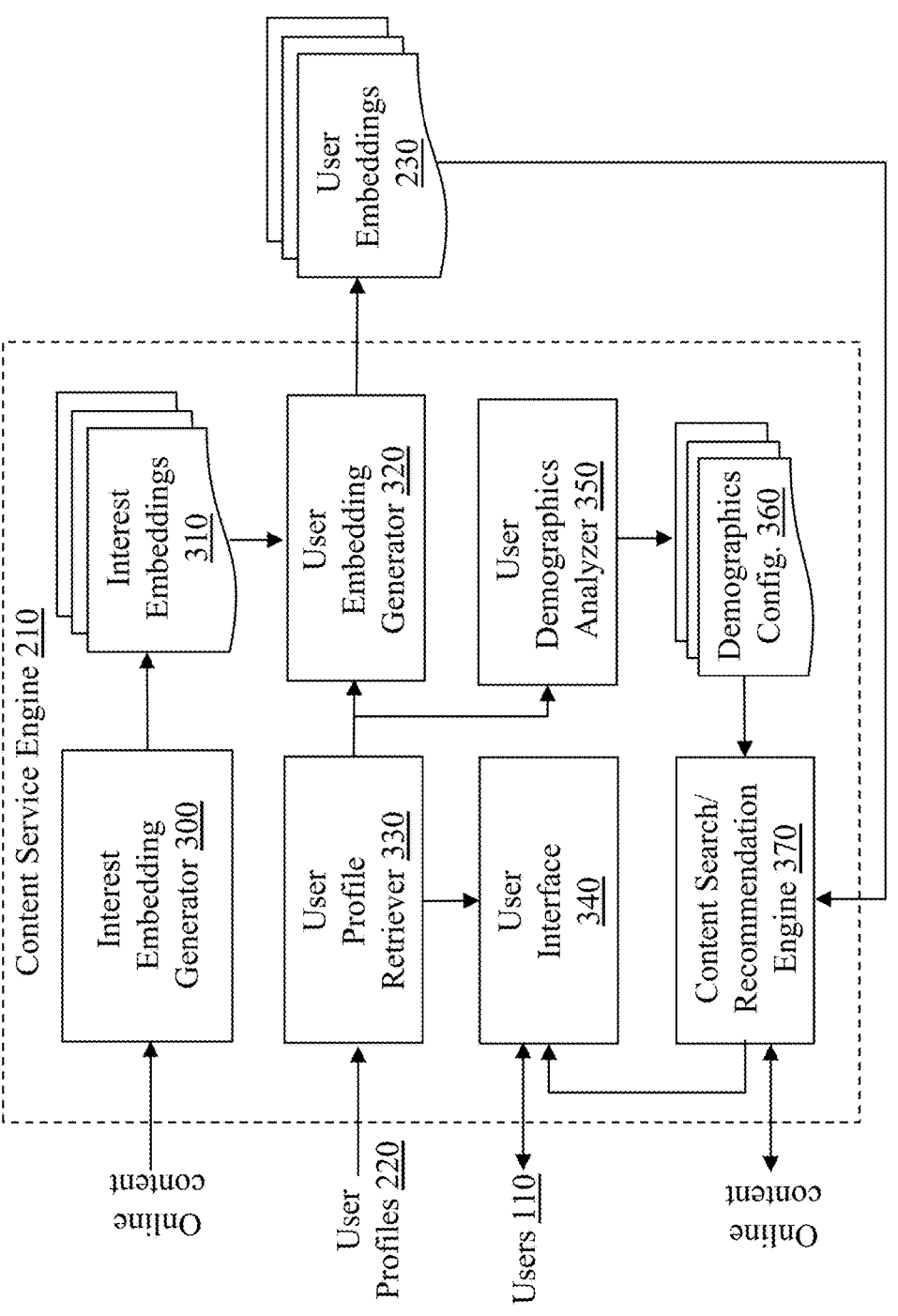
FIG. 3A depicts an exemplary high-level system diagram of a content serving engine, in accordance with an embodiment of the present teaching.

FIG. 3A depicts an exemplary high-level system diagram of the content service engine 210, in accordance with an embodiment of the present teaching. In this illustrated embodiment, the content service engine 210 includes two parts, one is to generate interest embeddings 310 and the other is to serve each user in content services by generating user embeddings 230 based on the interest embeddings 310 and identify content of user's interests by personalization based on the user embeddings 230. In some embodiments, in addition to the user embeddings 230, each user's demographical information from user profiles 220 may also be utilized in personalization. The first part of the content service engine 210 includes an interest embedding generator 300 which may be provided to create interest embeddings 310 based on online content. In some embodiments, interests for which embeddings are to be created in 310 may be defined according to some commonly recognized online sources such as, e.g., Wikipedia. That is, the textual information from such a source defining an interest (e.g., the definition from Wikipedia defining, e.g., "Twitter") may be used to train embeddings representing the interest. In some embodiments, additional text content from articles related to an interest may also be used to train the embeddings for the interest. For instance, Wikipedia may provide some links to online articles that provides more details about Twitter that support the Wikipedia's definition of "Twitter" may also be used for training the embeddings for "Twitter." In some embodiments, the interest embeddings created by the interest embedding generator 300 may encompass a comprehensive set of interests. In some embodiments, this set of interests may be determined based on the needs of applications in hand.

Figure 3B:
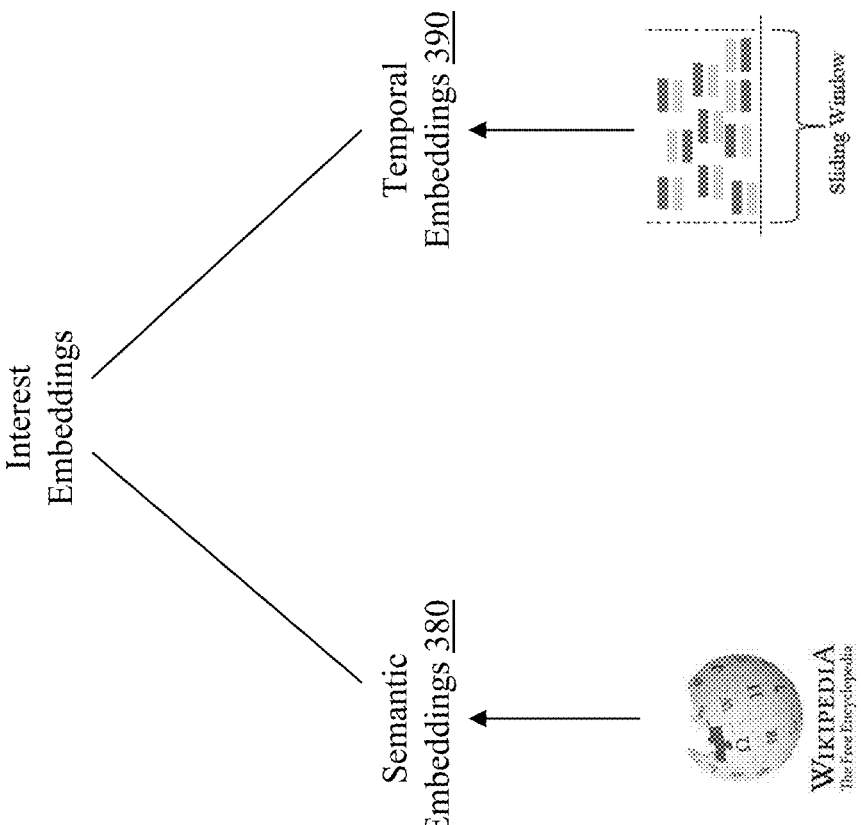
FIG. 3B illustrates an exemplary interest embeddings with semantic and temporal embeddings developed to facilitate construction of user embeddings based on listed user's interests, in accordance with an embodiment of the present teaching.

According to the present teaching, interest embeddings include both semantic embeddings 380 and temporal embeddings 390, as shown in FIG. 3B. As discussed herein, the semantic embeddings 380 capture the semantics of individual interests (e.g., as defined by Wikipedia and related articles) and the semantic relationships thereof. For instance, the semantic embedding vector for a Wikipedia entity Jennifer Lawrence (an interest) may be [0.2, 0.5, −0.93, . . . , 0.34]. On the other hand, the temporal embeddings 390 may capture co-occurring interests with respect to some defined temporal period represented by, e.g., a moving sliding window of a certain size. For example, Joe Biden, presidential election, and democratic party may be identified as co-occurring entities (interests) during a presidential election period because articles in this period have a high frequency to have these entities co-occur in the same articles.

Both semantic embeddings 380 for different interests as well as temporal embeddings 390 may be updated in time. Because of different natures of the two, the temporal embeddings 390 may have more of a transient nature and thus may need to be updated accordingly (e.g., more frequently) while the semantic embeddings 380 may be updated with a different schedule (e.g., less frequently). As such, the first part of the content service engine 210 may operate independently from other part in a continuous manner to maintain an updated storage of interest embeddings 310, which are used by the second part of the content service engine 210 as the basis to construct user embeddings 230 for personalization with respect to individual users according to their dynamically changing interests in providing services.

The second part of the content service engine 210 may be directed to providing personalized services via interest embeddings 310. This part includes a user interface 340, a user profile retriever 330, a user embedding generator 320, optionally a user demographics analyzer 350, and a content search/recommendation engine 370. The user interface 340 is provided to interact with users 110 such as taking a query from a user and provide personalized content to the user according to the query. In a different setting, personalized content may be recommended to users even in absence of users' queries. The user profile retriever 330 may be provided to access user profiles 220 to identify interests of each user to utilize the known interests of a user to dynamically construct user embeddings 230 based on interest embeddings 310 according to the known interests of each user. Such dynamically constructed user embeddings comprehensively represent the interests of the user and may then be used by the content search/recommendation engine 370 to search online content consistent with the interests of the user. In some embodiments, user's demographic information may also be used, either jointly or separately, to identify via search, online content of user's interests according to some configuration stored in 360 that specifies the relationship between demographics and topics of interest in content. Such searched online content is then delivered to the user via the user interface 340.

In this illustrated embodiment, the second part is disclosed for either searching or recommending content in a personalized manner based on user embeddings. The embeddings (including semantic embeddings, temporal embeddings, interest embeddings, and user embeddings) as disclosed herein may be used or leveraged in other applications as well. As discussed herein with reference to FIG. 2B, embeddings (any type as discussed in the present teaching) as learned via the present teaching correspond to feature points projected in a high dimensional feature space. As such, the distances between/among different points represent the affinity between/among them. In the interest embedding space, closer points represent similarity in interest. In the user embedding space, closer points represent users with affinity in their interests. For example, circle 200-4 in FIG. 2B includes two closely projected points and it indicate that the two are similar.

This may be leveraged in different use cases. For instance, the semantic affinity in different interests may be used to, e.g., explore additional user interests by finding similar interests. If a user is interested in a particular topic (e.g., natural healing) represented by corresponding semantic embeddings as a projected point, e.g., 200-1 in FIG. 2B, other nearby points in the same interest space (e.g., 200-2 in FIG. 2B) may represent similar interests (e.g., nature based diet) may be selected to identify content to be recommended to the user to see if the user is also interested. User embeddings (derived based on interest embeddings) may also be used in different applications. Points representing different user embeddings with small distances to each other may represent a potential user affinity group with some similarity among users in the group. Through clustering in the feature space may identify different user affinity groups. Such information may be used to, e.g., identify similar users in targeted online advertising, user notifications, offering personalized online services, etc.

Figure 4B:
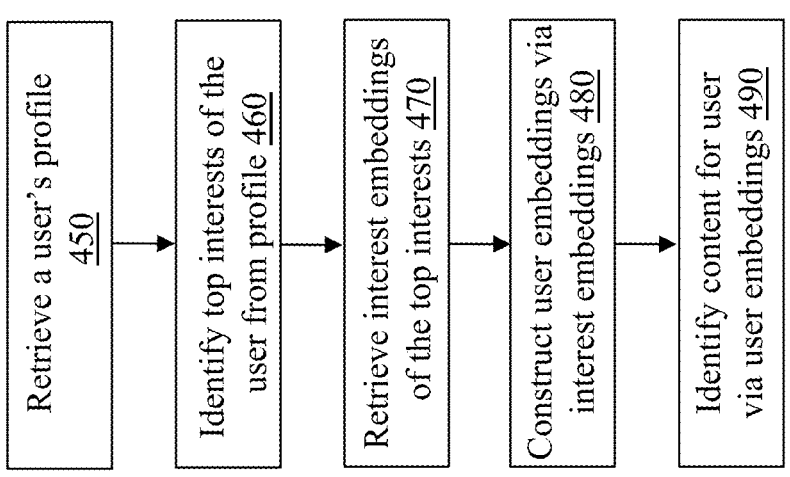
FIG. 4B is a flowchart of an exemplary process for utilizing interest embeddings to construct user embeddings based on a user's interest and personalizing content services to the user based on constructed user embeddings, in accordance with an embodiment of the present teaching.
Figure 4A:
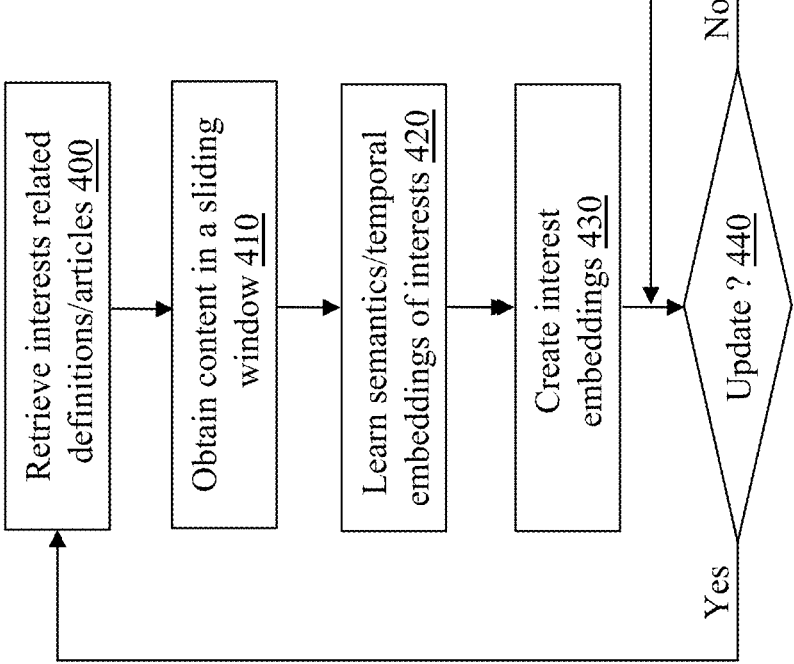
FIG. 4A is a flowchart of an exemplary process for learning and updating, via machine earning, interest embeddings, in accordance with an embodiment of the present teaching.

FIG. 4A is a flowchart of an exemplary process of the first part of the content service engine 210 for learning and updating, via machine earning, interest embeddings 310, in accordance with an embodiment of the present teaching. As discussed herein, as interest embeddings 310 serve as the basis (like vocabulary) for constructing semantic and temporal embeddings 380 and 390, respectively, for different users, they may be built systematically by enumerating by, e.g., all entities defined on Wikipedia platform. For instance, the interest embedding generator 300 may retrieve, at 400, textual information related to each of the entities (interests) defined by Wikipedia (providing definition for the entity) and, optionally, additional articles provided either through links from Wikipedia to support the definition or other online articles on the same topic(s) as training data for learning the semantic embeddings for the interest.

To generate temporal embeddings for each interest, the interest embedding generator 300 may also obtain, at 410, online content related to the interest within a temporal period specified by a sliding window as training data for learning the temporal embeddings for the interest. Based on such collected training data, the interest embedding generator 300 may then apply machine learning to train, at 420, the semantic embeddings 380 and temporal embeddings 390 to create the embeddings for each of the interests at 430. Once interest embeddings for different interests are established, the interest embedding generator 300 may regularly update the interest embeddings according to appropriate schedules. For instance, depending on the temporal period, the temporal embeddings 390 may need to be retrained with a higher frequency than that for semantic embeddings 380. The interest embedding generator 300 may check, at 440, whether an update is needed. If so, the processing proceeds to step 400 to carry out the needed re-training based on newly collected training data. Otherwise, the interest embedding generator 300 continues to check the need for re-training any part of the interest embeddings.

FIG. 4B is a flowchart of an exemplary process of the second part of the content service engine 210 for utilizing the interest embeddings 310 generated by the interest embedding generator 300 for personalization, in accordance with an embodiment of the present teaching. This second part of the content service engine 210 utilizes the interest embeddings 310 generated by the interest embedding generator 300 to derive individualized interest embeddings or user embeddings for each user to personalize the content service for each user. In operation, when a user interacting with the user interface 340, the user profile retriever 330 retrieves, at 450, the user profile and may identify, at 460, some interests specified in the user profile for personalization. In some embodiments, the content service engine 210 may be configured to select K interests from the user profile, where K may be selected based on some considerations associated with an application. For example, K may be set to be 5 so that 5 interests that have top 5 highest scores may be selected for personalization. In some embodiments, the selection may be based on the score values in [interest, score] pairs in the user profile in an order from the highest score in a descending order.

In some embodiments, the top K interests may also be selected based on other criteria appropriate for an application. For instance, a user interacting with the user interface 340 may enter a query specifically related to an interest category, e.g., physical therapy. In this case, the top K interests selected from the user profile may correspond to those that fall into a category related to physical therapy, even though the user may have strong interests in electric vehicles and cooking (i.e., having high scores in these interests) and a minor interest in health (i.e., having lower scores in health-related topics). In this case, interest "health" may be selected even though it has a lower score and interests associated with electric vehicle and cooking may not be selected despite that they have higher scores. That is, how top K interests are selected may be specified to be situation dependent and different selection conditions may be applied with respect to different situations.

Based on each of the selected top K interests, the interest embeddings (including both semantic embeddings 380 and temporal embeddings 390) for each of the K interests may be retrieved, at 470, from the interest embedding storage 310. The retrieved semantic and temporal embeddings associated with the K interests of the user may then be used for constructing, at 480, the user embeddings 230 (or individualized interest embeddings) for the user. With the constructed user embeddings for the user, the content search/recommendation engine 370 identifies, at 490, personalized content for the user that matches the user's interests captured by the user embeddings. There may be different ways to construct user embeddings based on semantic/temporal embeddings (380 & 390) corresponding to top K interests of the user. In some embodiments, the embeddings for the selected interests may be aggregated to generate the user embeddings for the user. For example, the following formulation may be used to aggregate interest embeddings of different interests to generate user embeddings for the user:

$$X = \frac{1}{n}\sum\nolimits_{i=1}^{n} x_i$$

where X is an aggregated attribute value of the user embeddings, n is the number of selected interests, and $x_i$ is the embedding attribute value of the interest embeddings associated with interest i. In some embodiments, the embedding attribute values $x_i$ may correspond to scaled attribute values, obtained by scaling the attribute values using, e.g., the score associated with the corresponding interest. Other means to aggregate interest embeddings of different interests to generate user embeddings may also be employed.

Figure 5A:
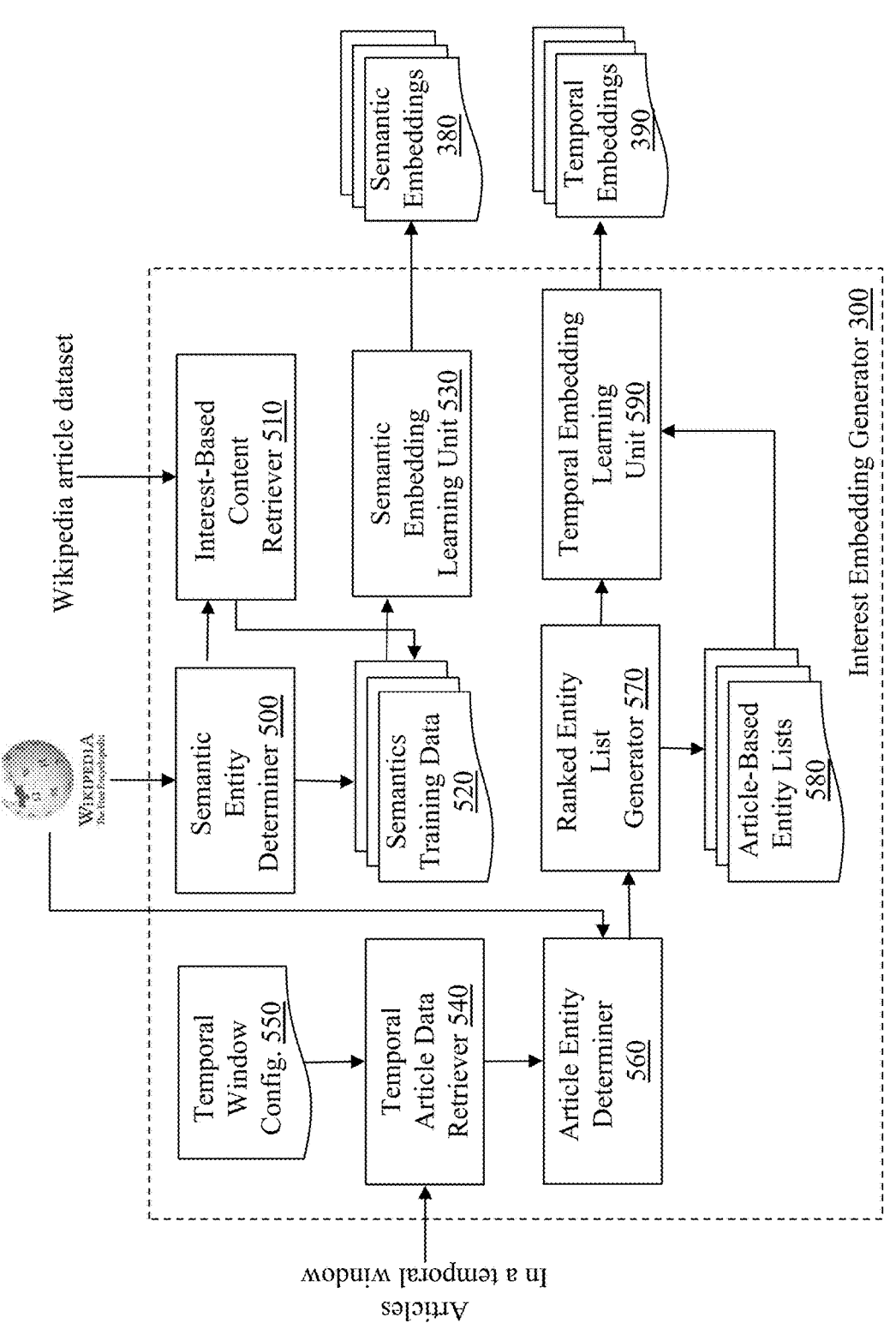
FIG. 5A depicts an exemplary high-level system diagram of an interest embedding generator, in accordance with an embodiment of the present teaching.

FIG. 5A depicts an exemplary high-level system diagram of the interest embedding generator 300, in accordance with an embodiment of the present teaching. As stated herein, the interest embeddings include both semantic embeddings (380) as well as temporal embeddings (390). Accordingly, the interest embedding generator 300 includes a first part for generating semantic embeddings for interests and a second part for generating temporal embeddings. The first part for generating semantic embeddings of different interests comprises a semantic entity determiner 500, an interest-based content retriever 510, and a semantic embedding learning unit 530. The second part for generating temporal embeddings with respect some specified temporal window 550 may comprise a temporal article data retriever 540, an article entity determiner 560, a ranked entity list generator 570, and a temporal embedding learning unit 590.

To build semantic embeddings for different interests, the semantic entity determiner 500 is provided for identifying entities (or interests) and their textual definitions from, e.g., Wikipedia. Such information on each interest may be used to train the semantic embeddings and may be stored in semantics training data storage 520 as training data. In some embodiments, articles that elaborate on the meaning of an interest, e.g., links to online articles provided by Wikipedia, may be used by the interest-based content retriever 510 to obtain additional text information associated with each entity/interest and save such additional information as additional semantics training data 520 related to the same interest. The collected textual information or training data associated with different interests in 520 may then be used by the semantic embedding learning unit 530 to conduct machine learning to derive the semantic embeddings 380 for different entities/interests.

To build temporal embeddings, a temporal window 550 is configured and stored in 550. For example, the temporal window 550 may be set to be, e.g., 48 hours. In operation, with the specified temporal window, the temporal article data retriever 540 may obtain articles falling within the configured temporal window so that they may be used to derive temporal embeddings. In some embodiments, based on the retrieved temporal articles, the article entity determiner 560 may process each of such articles to identify entities appearing in each of the articles. Such entities may include co-occurring interests. For instance, in articles on 2020 election, entity "Joe Biden" and entity "Presidential Election" may frequently occur in the same articles. In addition, in articles on environment, entities "global warming" and "environment pollution" may also co-occurring therein. The ranked entity list generator 570 may be provided to rank the entities identified from different temporal articles according to, e.g., their relevance to the articles. The ranked lists of entities 580 of different articles may then be provided to the temporal embedding learning unit 590 as training data to derive temporal embeddings 390.

FIG. 5B illustrates exemplary ranked entity lists generated from corresponding online articles for generating temporal embeddings, in accordance with an embodiment of the present teaching. In this illustrated exemplary table, each row may represent an article and columns in each row may correspond to ranked entities, entity E1, entity E2, . . . , entity En, arranged in an order based on their ranks. As illustrated in this example, article 1 may be about the hostile acquisition of Twitter by Elon Musk, where Elon Musk and Twitter are different entities co-occurring in the same article about the acquisition. Article 2 may be about a lawsuit brought by Twitter against Elon Musk, in which again both Elon Musk and Twitter co-occur in the same article as temporally related entities. The example article 3 in this illustration may be about the diplomatic incident related to the spy-balloon from China, in which entities "China," "spy balloon," and "diplomacy" may co-occur as temporally related entities. These temporally co-occurring entities in the same articles may provide contemporaneous evidence that these interests are related within the temporal window and may also be utilized for personalization. For example, if a user enters a query on "Elon Musk" within a temporal window as articles 1 and 2 in FIG. 5B, other content about Twitter may also be identified as relevant, given the temporal relationship between Elon Musk and Twitter, captured by the temporal embeddings.

Figure 5C:
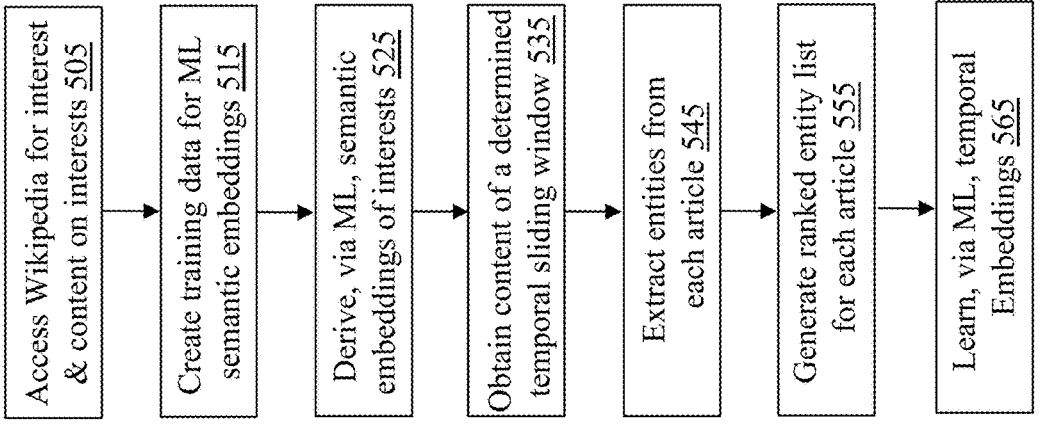
FIG. 5C is a flowchart of an exemplary process of an interest embedding generator, in accordance with an embodiment of the present teaching.

FIG. 5C is a flowchart of an exemplary process of the interest embedding generator 300, in accordance with an embodiment of the present teaching. As discussed herein, definitions for different interests and articles supporting such definitions may first be obtained (by semantic entity determiner 500 and interest-based content retriever 510), at 505, and used to create, at 515, semantics training data 520. The semantic embedding learning unit 530 then derives, at 525, via machine learning, semantic embeddings 380. To obtain temporal embeddings 390, the temporal article data retriever 540 obtains, at 535, content from a temporal sliding window. The article entity determiner 560 then extracts, at 545, entities from each of the articles from the temporal window which are then ranked by the ranked entity list generator 570, to generate, at 555, article-based entity lists 580 as training data. The temporal embedding learning unit 590 then obtains via learning, at 565, temporal embeddings 390. The learned semantic and temporal embeddings 380/390 are then stored as interest embeddings 310 and are used by the content service engine 210 to construct user embeddings for personalization.

Figure 6:
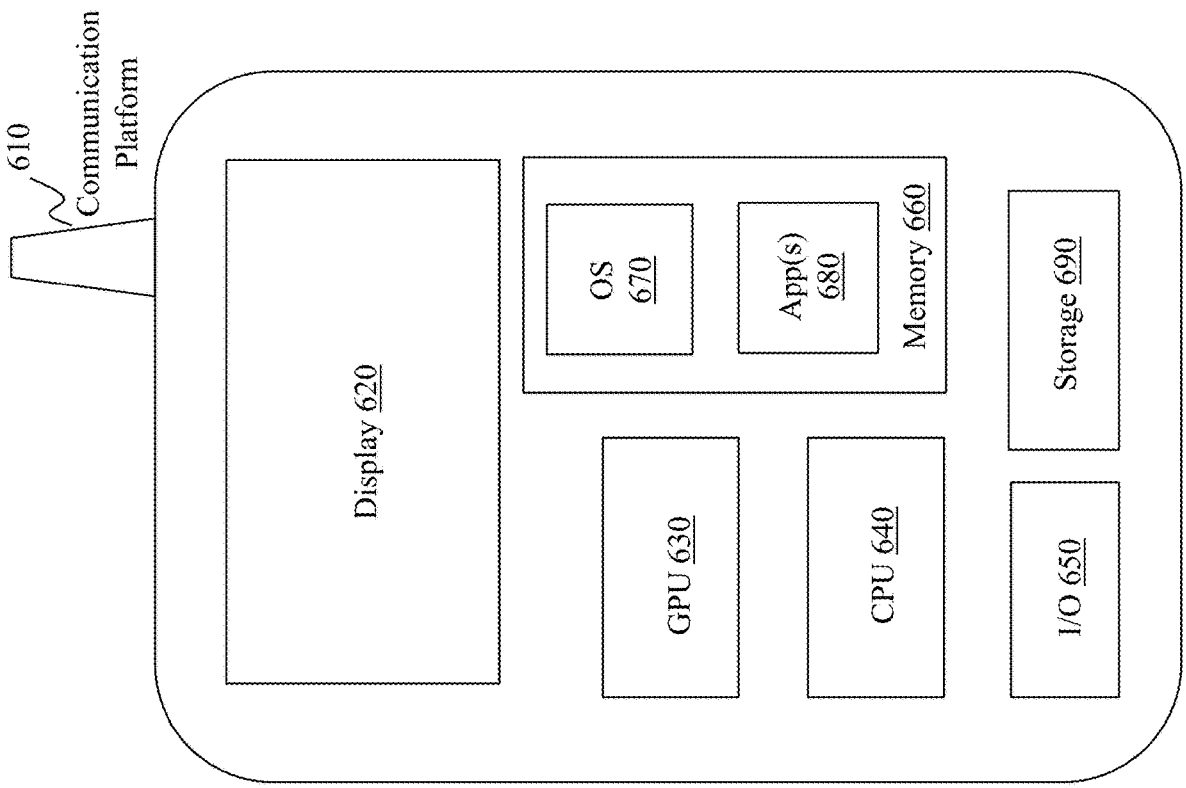
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a user interface or any other suitable mobile apps for information analytics and management according to the present teaching on, at least partially, the mobile device 600.

User interactions, if any, may be achieved via the I/O devices 650 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
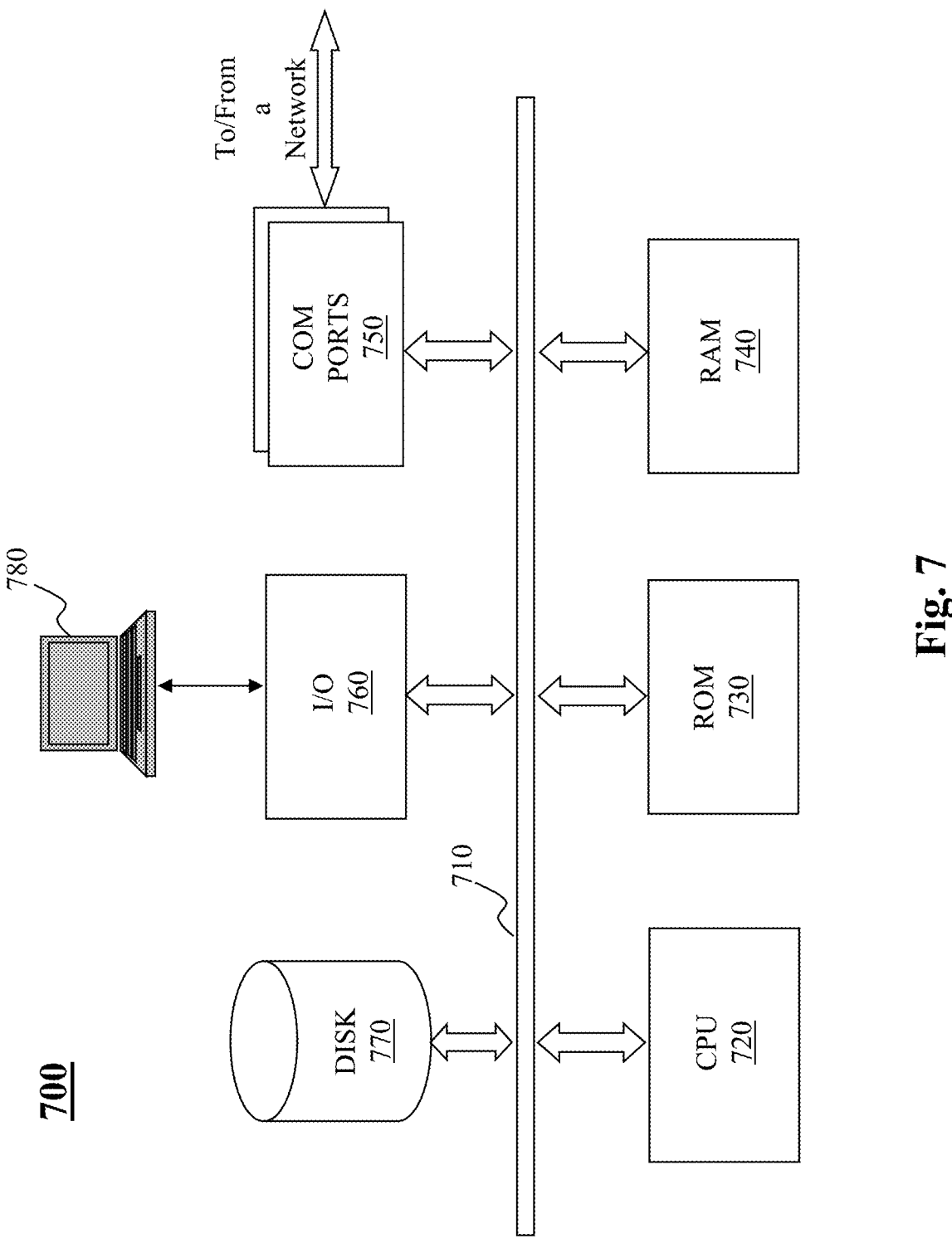
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information analytical and management method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

US 12,664,567 B2

13

We claim:

1. A method implemented on at least one processor, a memory, and a communication platform for personalized online content service, comprising:

obtaining information related to a user, including a user profile identifying multiple interests of the user;

training, via machine learning and based on training data including online textual information defining each of the multiple interests and additional information related to each of the multiple interests, semantic embeddings of interest embeddings associated with at least some interest that is selected from the multiple interests based on a score associated with each of the multiple interests;

training, via machine learning and based on training data including online content within a sliding window in time, temporal embeddings of the interest embeddings associated with the at least some interest;

retraining, based on newly collected training data, the semantic embeddings and the temporal embeddings, wherein the temporal embeddings are retrained at a higher frequency than the sematic embeddings thereby maintaining an updated storage of the interest embeddings;

scaling attributes of semantic embeddings for each of the at least some interest based on the score to derive scaled semantic embeddings of the interest with scaled attributes;

combining the scaled attributes across the semantic embeddings for the at least some interest to obtain aggregated semantic embeddings having aggregated scaled attributes therein;

dynamically constructing, based on the aggregated semantic embeddings and the temporal embeddings associated with the at last some interest, user embeddings with respect to the user, wherein the user embeddings capture semantics of the at least some interest, similarity between the semantics of the at least some interest and semantics of other of the multiple interests, and additional interests that are not yet included in the user profile but appear together with the at least some interest in the sliding window in time;

in response to receipt of user interaction at a user interface, identifying, based on the user embeddings, online content relating to the at least some interest and the additional interests not yet known to be within the multiple interests of the user; and providing, via the user interface, the online content to the user to personalize the online content service and to explore the additional interests of the user.

2. The method of claim 1, wherein each of the multiple interests is represented in the user profile based on a description of the interest and the score indicating a level of the interest with respect to the user.

3. The method of claim 2, wherein:

the semantic embeddings represent semantics of each of a plurality of interests; and the temporal embeddings capture at least one additional interest that co-occurs with any of the plurality of interests within the sliding window in time.

4. The method of claim 3, further comprising obtaining the temporal embeddings by:

obtaining online articles within the sliding window in time;

extracting multiple entities appearing in each of the online articles;

creating temporal training data based on ranked entity lists, each of which corresponds to one of the online articles with multiple entities of the article ranked based on a pre-determined criterion; and deriving, via machine learning based on the temporal training data, the temporal embeddings to capture temporal relationship among the plurality of interests within the sliding window in time.

5. A machine readable and non-transitory medium having information recorded therein for personalized online content service, wherein the information, when read by the machine, causes the machine to perform the following steps:

obtaining information related to a user, including a user profile identifying multiple interests of the user;

training, via machine learning and based on training data including online textual information defining each of the multiple interests and additional information related to each of the multiple interests, semantic embeddings of interest embeddings associated with at least some interest that is selected from the multiple interests based on a score associated with each of the multiple interests;

training, via machine learning and based on training data including online content within a sliding window in time, temporal embeddings of the interest embeddings associated with the at least some interest;

retraining, based on newly collected training data, the semantic embeddings and the temporal embeddings, wherein the temporal embeddings are retrained at a higher frequency than the sematic embeddings thereby maintaining an updated storage of the interest embeddings;

scaling attributes of semantic embeddings for each of the at least some interest based on the score to derive scaled semantic embeddings of the interest with scaled attributes;

combining the scaled attributes across the semantic embeddings for the at least some interest to obtain aggregated semantic embeddings having aggregated scaled attributes therein;

dynamically constructing, based on the aggregated semantic embeddings and the temporal embeddings associated with the at last some interest, user embeddings with respect to the user, wherein the user embeddings capture semantics of the at least some interest, similarity between the semantics of the at least some interest and semantics of other of the multiple interests, and additional interests that are not yet included in the user profile but appear together with the at least some interest in the sliding window in time;

in response to receipt of user interaction at a user interface, identifying, based on the user embeddings, online content relating to the at least some interest and the additional interests not yet known to be within the multiple interests of the user; and providing, via the user interface, the online content to the user to personalize the online content service and to explore the additional interests of the user.

6. The medium of claim 5, wherein each of the multiple interests is represented in the user profile based on a description of the interest and the score indicating a level of the interest with respect to the user.

7. The medium of claim 6, wherein:

semantic embeddings represent semantics of each of a plurality of interests; and temporal embeddings capture at least one additional interest that co-occurs with any of the plurality of interests within the sliding window in time.

8. The medium of claim 7, further comprising obtaining the temporal embeddings by:

obtaining online articles within the sliding window in time;

extracting multiple entities appearing in each of the online articles;

creating temporal training data based on ranked entity lists, each of which corresponds to one of the online articles with multiple entities of the article ranked based on a pre-determined criterion; and deriving, via machine learning based on the temporal training data, the temporal embeddings to capture temporal relationship among the plurality of interests within the sliding window in time.

9. A system for personalized online content service, comprising:

a user profile retriever implemented by a processor and configured for obtaining information related to a user, including a user profile identifying multiple interests of the user;

a user embedding generator implemented by a processor and configured for training, via machine learning and based on training data including online textual information defining each of the multiple interests and additional information related to each of the multiple interests, semantic embeddings of interest embeddings associated with at least some interest that is selected from the multiple interests based on a score associated with each of the multiple interests, training, via machine learning and based on training data including online content within a sliding window in time, temporal embeddings of the interest embeddings associated with the at least some interest, retraining, based on newly collected training data, the semantic embeddings and the temporal embeddings, wherein the temporal embeddings are retrained at a higher frequency than the sematic embeddings thereby maintaining an updated storage of the interest embeddings, scaling attributes of semantic embeddings for each of the at least some interest based on the score to derive scaled semantic embeddings of the interest with scaled attributes, combining the scaled attributes across the semantic embeddings for the at least some interest to obtain aggregated semantic embeddings having aggregated scaled attributes therein, and dynamically constructing, based on the aggregated semantic embeddings and the temporal embeddings associated with the at last some interest, user embeddings with respect to the user, wherein the user embeddings capture semantics of the at least some interest, similarity between the semantics of the at least some interest and semantics of other of the multiple interests, and additional interests that are not yet included in the user profile but appear together with the at least some interest in the sliding window in time;

a content search/recommendation engine implemented by a processor and configured for in response to receipt of user interaction at a user interface, identifying, based on the user embeddings, online content relating to the at least some interest and the additional interests not yet known to be within the multiple interests of the user; and the user interface implemented by the processor and configured for providing the online content to the user to personalize the online content service and to explore the additional interests of the user.

10. The system of claim 9, wherein each of the multiple interests is represented in the user profile based on a description of the interest and the score indicating a level of the interest with respect to the user.

11. The system of claim 10, wherein:

semantic embeddings represent semantics of each of a plurality of interests; and temporal embeddings capture at least one additional interest that co-occurs with any of the plurality of interests within the sliding window in time.

12. The system of claim 11, further comprising obtaining the temporal embeddings by:

obtaining online articles within the sliding window in time;

extracting multiple entities appearing in each of the online articles;

creating temporal training data based on ranked entity lists, each of which corresponds to one of the online articles with multiple entities of the article ranked based on a pre-determined criterion; and deriving, via machine learning based on the temporal training data, the temporal embeddings to capture temporal relationship among the plurality of interests within the sliding window in time.

\* \* \* \* \*